United States Patent [19]

Nussbaum

[11] 4,368,225
[45] * Jan. 11, 1983

[54] MOLDING LAMINATE

[75] Inventor: Joel H. Nussbaum, Farmington Hills, Mich.

[73] Assignee: The Standard Products Co., Cleveland, Ohio

[*] Notice: The portion of the term of this patent subsequent to Sep. 14, 1999, has been disclaimed.

[21] Appl. No.: 250,879

[22] Filed: Apr. 3, 1981

[51] Int. Cl.³ .................. B32B 31/30; B60R 13/04
[52] U.S. Cl. .................................. 428/31; 52/716; 293/1
[58] Field of Search ............... 428/31, 122, 358; 52/716; 293/1

[56] References Cited

U.S. PATENT DOCUMENTS

| | | | |
|---|---|---|---|
| 3,355,319 | 11/1967 | Rees | 428/497 X |
| 3,543,465 | 12/1970 | Jackson | 428/31 X |
| 3,616,099 | 10/1971 | Shanok et al. | 428/192 X |
| 3,982,780 | 9/1976 | Keith | 428/31 X |
| 4,010,297 | 3/1977 | Wenrick | 428/41 X |
| 4,037,013 | 7/1977 | Sprague | 428/327 X |
| 4,148,972 | 4/1979 | Yamane et al. | 428/515 |
| 4,277,526 | 7/1981 | Jackson | 428/31 |
| 4,298,640 | 11/1981 | Katoh | 428/31 |

Primary Examiner—Henry F. Epstein
Attorney, Agent, or Firm—Harness, Dickey & Pierce

[57] ABSTRACT

Disclosed is an extruded laminate and a method for making the laminate. Protective and decorative molding and trim strips for automotive vehicles and the like can be made from the laminate which comprises a body of an extruded thermoplastic material such as extruded polyvinylchloride and an extruded outer layer of a different and incompatible material with a tie sheet sandwiched therebetween. The tie sheet is a thin laminate of a layer compatible with the thermoplastic material of the body and a layer compatible with the material of the outer layer. Optionally, a decorative layer of metallized polyester and/or other material can be encapsulated between the tie sheet and the body or outer layer.

8 Claims, 6 Drawing Figures

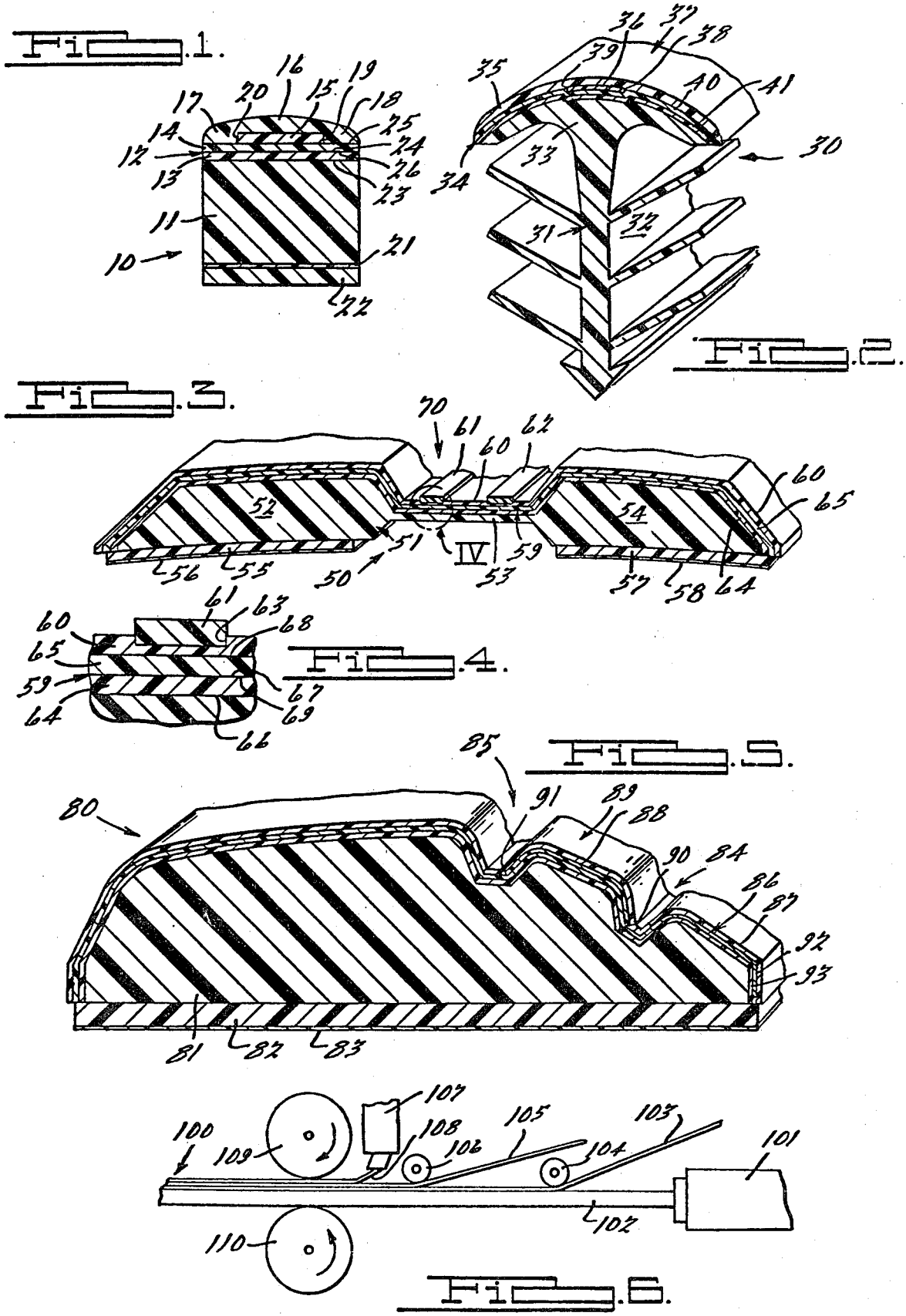

MOLDING LAMINATE

BACKGROUND AND SUMMARY OF THE INVENTION

This invention relates to laminated products or constructions and their method of making, and, in particular, relates to trim strips or moldings made therefrom which are adapted for attachment to automobiles or other vehicles for decorative and protective purposes. Trim strips or moldings made in accordance with this invention are attractive in appearance and can serve a protective function as, for example, body side molding on an automobile. Yet the molding can be economically manufactured. As used hereinafter, the term "molding" will be used with the understnading that it broadly includes molding strips, trim strips and the like.

Automotive moldings are well known and have been used for many years to improve the appearance and protect the bodies of automotive vehicles. In recent years there has been increasing use of plastic materials in the manufacture of moldings. While such moldings offer satisfactory performance and appearance characteristics, there is a continuing need for improved moldings incorporating various plastic materials. Thus, it would be desirable to have a molding comprised of a body of extruded polyvinylchloride which is a conventional and economical molding material and a cover of extruded ionomer resin which has characteristics of toughness, resiliency and resistance to solvents, abrasion, weathering and cracking desirable in a molding. In addition, it would be desirable to have a molding of a polyvinylchloride body and an ionomer resin cover with a metallic appearing decorative strip sandwiched and encapsulated therebetween. Such a molding would maximize the advantage and minimize the disadvantages of using each material.

Unfortunately, it is very difficult to extrude a molding of a body of polyvinylchloride and a cover of ionomer resin with good bonding therebetween. This is due in part to the chemical incompatibility of the two resins and in part to the relatively thick and/or complex cross-sectional shapes of moldings.

Although it has been found to be difficult to laminate dissimilar layers such as polyvinylchloride and ionomer resin using the usual extrusion techniques employed in plastic molding technology, the present invention provides a laminate construction in which the lamination of such extruded layers is facilitated by interposing a tie sheet therebetween. The tie sheet comprises a laminate of a first layer comprising a material compatible with one extruded layer body and a second layer comprising a material compatible with the other extruder layer. By the term "compatible" it is meant that the one material will bond to the other material using conventional extrusion lamination techniques involving heat.

BRIEF DESCRIPTION OF THE DRAWINGS

FIG. 1 is a transverse sectional view of a laminate made in accordance with the present invention;

FIG. 2 is a perspective view, broken away and in section, of an alternative molding made in accordance with the present invention;

FIG. 3 is a perspective view, broken away and in section, of still another alternative molding made in accordance with the present invention;

FIG. 4 is an enlarged view of the portion of FIG. 3 indicated by the numeral IV;

FIG. 5 is a perspective view, broken away and in section, of yet another alternative embodiment of the present invention; and FIG. 6 is a somewhat diagrammatical view of a method of making a laminate construction in accordance with the present invention.

DESCRIPTION OF THE INVENTION

In accordance with the present invention, it has been found that a laminate of a body of an extruded thermoplastic material and an outer layer of a dissimilar extruded thermoplastic material can be provided by interposing therebetween a tie sheet which is a laminate of a first layer of a material compatible with the material in the body and a second layer of a material compatible with the material in the outer layer. For example, a molding of the present invention can comprise an extruded polyvinylchloride (PVC) body, an outer layer of extruded ionomer resin, and a tie sheet bilaminate of a PVC sheet and an ionomer resin sheet. The tie sheet bilaminate is sandwiched between the body and outer layer with the PVC sheet contiguous to and bonded to the PVC body and the ionomer resin sheet contiguous to and bonded to the outer layer. In addition, the molding can have a bright, metallic strip or other decorative strip encapsulated between portions of the tie sheet and the outer layer.

In accordance with the method of the present invention, a thermoplastic such as PVC is extruded to form a molding body which is then laminated, using conventional extrusion laminating techniques involving heat, to a first layer of a bilaminate tie sheet. The tie sheet is a bilaminate of a first layer comprising a material which is compatible with the thermoplastic body and a second layer. By "compatible" it is meant that the materials will adhere together under conventional extrusion laminating technique involving heat. The layers of the tie sheet are laminated together using conventional sheet lamination techniques including pressure rollers and an adhesive. An outer layer of a thermoplastic material, such as ionomer resin, is then laminated to the second layer of the tie sheet, which is of a material compatible therewith, using conventional extrusion lamination techniques involving heat.

PVC and ionomer resin thermoplastic materials suitable for extrusion and use in moldings are commercially available and known in the art. For example, suitable ionomer resin materials include Surlyn ® blends such as PS20N supplied by Adell.

The tie sheet of the present invention is a laminate of a first layer compatible with the extruded thermoplastic body and a second layer compatible with the outer layer which is a material incompatible with the material of the body and difficult to laminate thereto using conventional extrusion lamination techniques. It will, of course, be appreciated that the layers of the tie sheet would likewise be difficult to laminate using conventional extrusion techniques. However, the layers of the tie sheet are laminated together using conventional sheet lamination techniques which are more effective under production conditions. Thus, the respective first and second layers can be joined together by a conventional adhesive such as a 2-part urethane adhesive, for example, "Adcote" 122 from Morton Chemical Co. The respective layers can be passed between calender rolls to urge them together and to remove dead air from between layers. Preferably, the tie sheet layers have thicknesses of from about 1.5 to about 10 mils for the first layer and from about 3 to about 30 mils for the second layer. Generally speaking the tie sheet is a bilaminate, however, more than two layers may be employed in the tie sheet so long as the aforementioned first and second layers of the tie sheet are positioned against the body and outer layer, respectively. Of course, it will also be understood that the outer layer can have one or more additional layers thereon without departing from the concept of the present invention. The term "outer layer" refers to the layer which is relatively outer with respect to the sandwich of the body, tie sheet, and outer layer.

A tie sheet of the present invention for use with an extruded PVC body and an extruded ionomer resin outer layer can suitably have a first layer comprising a PVC sheet material and a second layer comprising an ionomer resin sheet.

It has been found that a decorative film such as metalized polyester film can be encapsulated between a portion of the outer layer and tie sheet to provide a bright metallic appearance to a portion of the laminate. In addition, a grain pattern or embossment can be provided on the outer layer. It will be understood that a clear or transparent outer layer should be employed so that the decorative film can be seen therethrough. Of course, if no decorative film is used, the outer layer can be pigmented to obtain the desired color.

Now referring to the figures, FIGS. 1-5 show preferred embodiments of laminate constructions of the present invention including molding or trim strips for automotive vehicles. FIG. 1 illustrates a laminate of the present invention which is indicated generally by the numeral 10. Laminate 10 is an elongated laminate shown in transverse cross-section to illustrate the laminated layers thereof. Laminate 10 has a relatively thick extruded body 11 which has a tie sheet 12 laminated thereto. Body 11 is made of PVC material while tie sheet 12 comprises a bilaminate of a first layer 13 comprising a material compatible with body 11, PVC, and which is adhesively laminated to a second layer 14 comprising a material compatible with outer layer 16. Outer layer 16 comprises a material, ionomer resin, which is incompatible with the material of body 11. In manufacture of laminate 10, tie sheet 12 is made using conventional sheet laminating techniques while laminations of tie sheet 12 to body 11 and tie sheet 12 to outer layer 16 are made using conventional extrusion techniques involving heat. Thus, first layer 13 is laminated to body 11 and second layer 14 is laminated to outer layer 16 using conventional extrusion technique involving heat. A bright strip 15 of decorative polyester film such as metallized Mylar ® is interposed between tie sheet 12 and outer layer 16. Second layer 14 of tie sheet 12 comprises an ionomer resin sheet which is, of course, compatible with the ionomer resin of outer layer 17 and readily bonds thereto. Bright strip 15 is completely encapsulated and retained within molding 10 by the construction of the present invention since side edge portions 17 and 18 of layer 16 completely cover the side edges 19 and 20 of bright strip 15. It should, of course, be understood that clear layer 16 is laminated along side portions 17 and 18 to layer 14 of tie strip 12 by conventional extrusion techniques involving heat.

Means for attaching molding 10 to a surface of an automobile or the like is provided by pressure sensitive tape 22 which is adhesively secured to body 11 by a layer of adhesive 21. If desired, a suitable barrier layer, such as a conventional barrier layer, for example, an aluminum layer, can be interposed between tape 22 and body 11 to prevent migration of plasticizer from body 11 into the adhesive 21.

Thus, in accordance with the present invention, laminate 10 has a body portion 11 comprised of a PVC thermoplastic material and to which is laminated a tie sheet 12 which is a bilaminate of a first layer of PVC material and a second layer of ionomer resin material. Surface 23 of tie strip 12 is laminated to body 11 using conventional extrusion technology involving heat. Surface 26 of first layer 13 is laminated to surface 24 of second layer 14 of tie sheet 13 by means of a conventional adhesive, such as a 2-part urethane adhesive and by a conventional sheet laminating technique. Surface 25 of second layer 14 presents a surface to which the outer layer 16 can be laminated using a conventional extrusion technique. A decorative layer 15 can be encapsulated between outer layer 16 and the sheet 12. Outer layer 16 comprises an ionomer resin and is transparent to allow view of decorative layer 15.

Now referring to FIG. 2, an alternative molding made in accordance with the present invention is shown and indicated generally by the numeral 30. Molding 30 is a molding suitable for use, for example, around the windshield of an automotive vehicle. Molding 30 comprises a body 31 which has a portion 32 adapted to be retained in a channel about a windshield in a conventional manner and a head portion 33 adapted to extend outwardly from the retaining channel. Body 31 is made of PVC material. One side of tie sheet 34 is laminated to the outwardly facing surface of heat portion 33 while the other side of the tie sheet 34 is laminated to outer layer 35. Outer layer 35 comprises an ultraviolet stablized ionomer resin, a Surlyn ® blend, supplied by Adell as PS20N. Disposed between a portion of tie sheet 34 and outer layer 35 is a bright strip 36 of metallized polyester film. In a manner similar to the molding 10 of FIG. 1, the bright strip 36 presents a bright surface indicated generally by the numeral 38 and enhances the appearance of molding 30. Side edges 38 and 39 of bright strip 36 are encapsulated within layers 35 and tie strip 34 to prevent deterioration thereof by exposure of bright strip 36 to the elements.

Tie sheet 34 comprises a first layer 41 and a second layer 40 which are adhesively laminated to each other by a conventional sheet laminating technique prior to lamination of tie sheet 34 to body 31. First layer 41 of tie sheet 34 comprises a material compatible with the PVC material of body 31 such as a PVC sheet and hence, can be laminated to body 31 of molding 30 using conventional extrusion techniques involving heat. Second layer 40 of tie sheet 34 comprises a Surlyn ® material and hence, facilitates lamination of outer layer 35 thereon by conventional extrusion techniques.

Now referring to FIGS. 3 and 4, still another alternative embodiment of the present invention is shown and indicated generally by the numeral 50. Molding 50 is of a design suitable, for example, for use as a body side molding for an automotive vehicle. Molding 50 comprises a body 51 which is somewhat dumbbell shaped in cross-section, having enlarged side portions 52 and 54 joined by a relatively thin intermediate portion 53.

As is shown in FIG. 4, a strip 61 is secured partially within slot 63 cut into an outer layer 60. Strip 62 is secured in an analogous slot. Body 51 comprises a PVC material. Means for attaching respective side portions 52 and 54 of molding 50 to the surface of a vehicle or the like is provided by pressure sensitive tape strips 55 and 57 with respective release liners 56 and 58. Tie strip 59 is laminated to body 51 and outer layer 60 is laminated to tie strip 59. Outer layer 60 is comprised of an ionomer resin material.

Tie sheet 59 has first layer 64 comprising a PVC material and a second layer 65 comprising an ionomer material. Surfaces 67 and 69 of tie sheet 59 are adhesively secured to each other prior to use of the sheet 59 by a conventional sheet laminating technique. Thus, tie sheet 59 has surface 66 which can be readily laminated to outer layer 60 with conventional extrusion techniques using heat.

Thus, molding 50 obtains the advantages hereinbefore set forth with regard to the present invention. Molding 50 also emphasizes the advantages of the present invention with regard to providing an elongated molding structure having a notch 70 extending along the length thereof and hence, having a structure most easily formed by extrusion techniques, i.e., a complex cross-section.

Now referring to FIG. 5, still another alternative embodiment of the present invention is shown and indicated generally by the numeral 80. Molding 80 comprises a body 81 made of PVC material and has pressure sensitive tape 82 with release liner 83 secured to one surface thereof to provide means for attaching molding 80 to a structural surface, such as the side of an automotive vehicle body. Body 81 has a pair of notches 84 and 85 extending axially therealong to enhance the appearance thereof, thus providing a structure best suited for an extrusion process. Laminated to body 81 is tie sheet 86. Laminated to tie sheet 86 is outer layer 87 which comprises a clear ionomer resin material. A decorative polyester film strip 88 is sandwiched between a portion of outer layer 87 and tie sheet 86 and is encapsulated thereby. Thus, molding 80 is adapted to present a bright metallic portion along the portion generally indicated by the numeral 89. Side edges 90 and 91 of decorative film 88 are covered by outer layer 87 and hence, decorative film 88 is sealed and protected from the weather elements.

Tie sheet 86 has a first layer 93 comprising a PVC material and a second layer 92 comprising an ionomer resin material. Layers 93 and 92 are laminated to each other by means of an adhesive and conventional sheet laminating technique prior to incorporation of tie sheet 86 in molding 80.

Thus, tie sheet 86 allows use of a body 81 comprised of PVC material and the advantages attendant thereto while facilitating lamination of an outer layer 87 of ionomer resin using extrusion techniques to obtain the advantages with regard to toughness and appearance attendant to use of the latter material. Thus, obtained is an economical and functional molding having an excellent appearance including bright work.

Now referring to FIG. 6, a process for making a laminate construction of the present invention is illustrated somewhat diagrammatically. Thus, a lamination 100 of this invention is provided by extruding body 102 with horizontal extruder 101. After extrusion of body 102, tie sheet 103 is passed between body 102 and roller 104 and is laminated by heat to body 102. Tie sheet 102 can be a previously laminated tie sheet or the layers thereof can be laminated together as the tie sheet is applied to body 102. Optionally, a decorative strip 105 is then layered on tie sheet 103 under roller 106.

Then an outer layer 108 is extruded by vertical extruder 107 on top of strip 105 and tie sheet 103 whereupon the entire laminate construction is passed between calender rollers 109 and 110 which apply pressure thereto. It will be appreciated that the materials and adjacent layers thereof are in accordance with the foregoing disclosure which will not be repeated here.

While the present invention has been disclosed largely in terms of laminate constructions adapted for use as moldings or trim strips for automotive vehicles, it will be appreciated by those skilled in the art that the invention herein is subject to modification and variation and is broadly adaptable for other products. Thus, housings or covers can be die cut and thermoformed out of the product provided in accordance with the present invention without loss of advantages thereof. Furthermore, the laminated products of the present invention can comprise a thermoplastic elastomer body with good resistance to chemicals, wear, weathering, and so forth. Therefore, it is intended that the present invention be limited only by the spirit and scope of the claims appended hereto.

What is claimed is:

1. A laminate construction having an extruded body comprising a first extruded thermoplastic; an outer layer of second extruded thermoplastic incompatible with said first thermoplastic; and a tie sheet sandwiched between and laminated to each of said body and said outer layer; said tie sheet comprising an adhesively secured laminate of a first layer and a second layer, said first layer being heat laminated to said body and comprising a first material compatible with said first thermoplastic, and said second layer being heat laminated to said outer layer and comprising a second material compatible with said second thermoplastic.

2. A laminate as in claim 1 wherein said first extruded thermoplastic and said first layer each comprise polyvinylchloride.

3. A laminate as in claim 1 wherein said second thermoplastic and said second layer each comprise ionomer resin.

4. A laminate as in claim 2 wherein said second thermoplastic and said second layer each comprise ionomer resin.

5. A laminate as in claim 1 wherein a decorative strip is sandwiched between portions of said second layer and said outer layer.

6. A laminate as in claim 1 wherein said laminate is a molding adapted for use with an automotive vehicle.

7. A laminate as in claim 6 wherein said molding is adapted to be secured to the side of an automotive vehicle.

8. A laminate as in claim 6 wherein said body has a portion adapted to be retained in a channel about an automotive windshield.

* * * * *